US010932080B2

(12) United States Patent
Mouncer

(10) Patent No.: US 10,932,080 B2
(45) Date of Patent: Feb. 23, 2021

(54) MULTI-SENSOR OBJECT TRACKING FOR MODIFYING AUDIO

(71) Applicant: Microsoft Technology Licensing, LLC, Redmond, WA (US)

(72) Inventor: Brian Eugene Mouncer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 16/276,162

(22) Filed: Feb. 14, 2019

(65) Prior Publication Data

US 2020/0267493 A1    Aug. 20, 2020

(51) Int. Cl.
*H04S 7/00* (2006.01)
*G06T 7/70* (2017.01)

(52) U.S. Cl.
CPC .............. *H04S 7/303* (2013.01); *G06T 7/70* (2017.01); *G06T 2207/10028* (2013.01)

(58) Field of Classification Search
CPC . H04S 7/303; H04S 7/301; G06T 7/70; G06T 2207/10028
USPC .............. 381/303, 56, 58, 300, 92; 700/94; 348/207.1, 207.99; 715/716; 340/539.13, 340/539.11
See application file for complete search history.

(56) References Cited

U.S. PATENT DOCUMENTS

| | | | |
|---|---|---|---|
| 6,741,273 B1 | 5/2004 | Waters et al. | |
| 9,338,575 B2 | 5/2016 | Mitra et al. | |
| 9,392,368 B2 | 7/2016 | Robinson et al. | |
| 9,431,980 B2 | 8/2016 | Popova | |
| 2005/0081160 A1* | 4/2005 | Wee | H04H 60/33 715/755 |
| 2007/0202858 A1 | 8/2007 | Yu | |
| 2011/0157327 A1 | 6/2011 | Seshadri et al. | |
| 2012/0093320 A1 | 4/2012 | Flaks et al. | |
| 2013/0041648 A1 | 2/2013 | Osman | |
| 2013/0083948 A1 | 4/2013 | Schmidt | |

(Continued)

OTHER PUBLICATIONS

"Galaxy Home: Samsung's answer to the HomePod", Retrieved From: https://www.cnet.com/videos/galaxy-home-samsungs-answer-to-the-homepod/, Aug. 9, 2018, 3 Pages.

(Continued)

*Primary Examiner* — Vivian C Chin
*Assistant Examiner* — Con P Tran
(74) *Attorney, Agent, or Firm* — Alleman Hall Creasman & Tuttle LLP

(57) ABSTRACT

Examples are disclosed that relate to repositioning a location of an acoustic sweet spot for a multi-speaker system. One example provides a computing system configured to receive first location data regarding a first location of an object in a space as determined from data acquired by a first image sensor having a fixed location within the space, send a notification to an audio-providing device regarding the first location of the object as determined from the data acquired by the first image sensor, receive second location data regarding a second location of the object in the space as determined by a second sensor, the second location being outside of a view of the first image sensor, and based on receiving the second location data, send a notification to the audio-providing device regarding the second location of the object as determined by the second sensor.

20 Claims, 8 Drawing Sheets

(56) References Cited

U.S. PATENT DOCUMENTS

2013/0342564 A1* 12/2013 Kinnebrew .......... G02B 27/017
                                                    345/619
2014/0328505 A1   11/2014 Heinemann et al.
2015/0373477 A1* 12/2015 Norris ..................... H04S 1/002
                                                    381/303
2015/0382129 A1   12/2015 Florencio et al.

OTHER PUBLICATIONS

"QR Code Tracking", Retrieved From: https://docs.microsoft.com/en-us/windows/mixed-reality/qr-code-tracking, Nov. 6, 2018, 9 Pages.
"Shared Experiences in Mixed reality", Retrieved From: https://docs.microsoft.com/en-us/windows/mixed-reality/shared-experiences-in-mixed-reality, Mar. 21, 2018, 9 Pages.
"U.S. Appl. No. 15/922,791", filed Mar. 15, 2018, 50 Pages.
Merchel et al., "Analysis and Implementation of a Stereophonic Play Back System for Adjusting the "Sweet Spot" to the Listener's Position", In Proceedings of 126th Convention on Audio Engineering Society, May 7, 2009, 9 Pages.
"International Search Report and Written Opinion Issued in PCT Application No. PCT/US20/014685", dated Jun. 25, 2020, 21 Pages.

* cited by examiner

MULTI-SENSOR OBJECT TRACKING FOR MODIFYING AUDIO

BACKGROUND

Signals provided to speakers of a multi-channel audio system may be calibrated to provide an acoustic "sweet spot" within the environment. The acoustic sweet spot may be spatially coincident, for example, with a sofa, a chair, or other location at which a user is likely to be located while listening to audio.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to tracking a location of an object in a coordinate system shared by multiple sensors for repositioning a location of an acoustic sweet spot. One disclosed example provides a computing system comprising a logic subsystem comprising one or more processing devices, and memory storing instructions executable by the logic subsystem to receive first location data regarding a first location of an object in a space as determined from data acquired by a first image sensor having a fixed location within the space, and based on receiving the first location data, to send a notification to an audio-providing device regarding the first location of the object as determined from the data acquired by the first image sensor. The instructions are further executable to receive second location data regarding a second location of the object in the space as determined by a second sensor, the second location being outside of a view of the first image sensor, and based on receiving the second location data, send a notification to the audio-providing device regarding the second location of the object as determined by the second sensor.

DETAILED DESCRIPTION

Figure 1A:
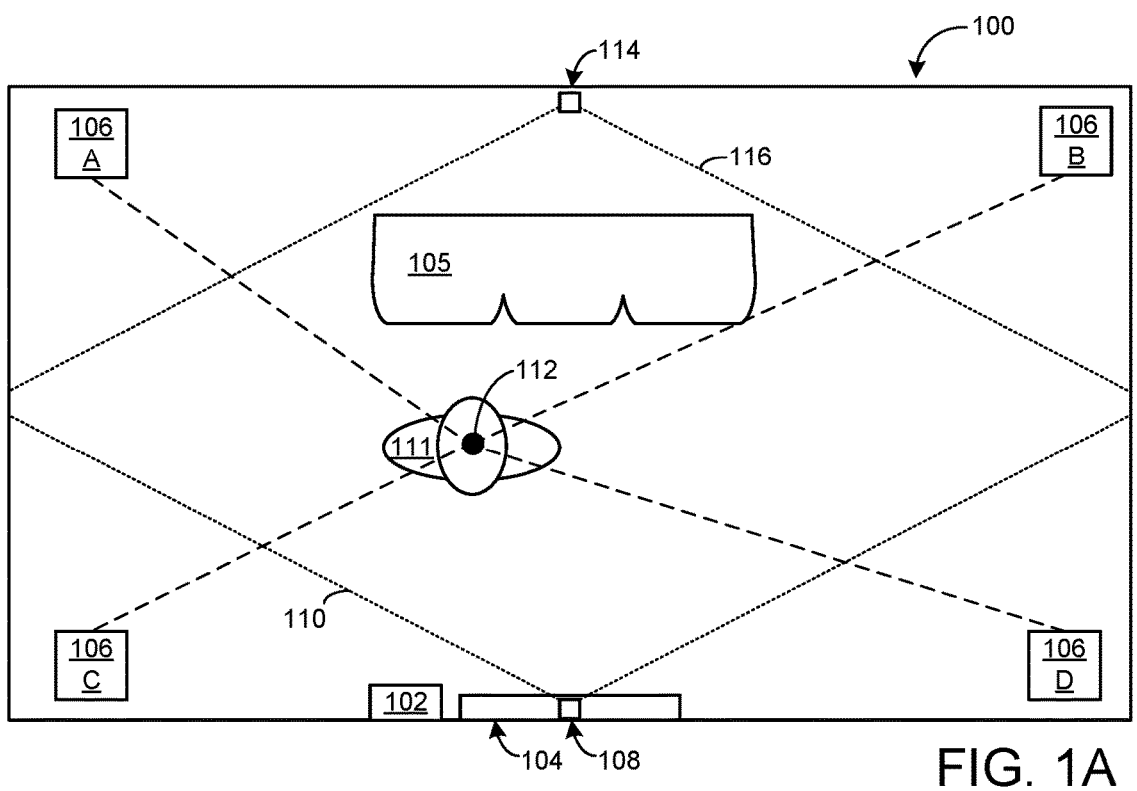
FIGS. 1A and 1B schematically depict an example use environment for providing via multiple speakers an acoustic sweet spot that can be moved to track a location of an object.

Some audio output systems may calibrate audio signals that are output to multiple speakers based on various characteristics of a use environment to provide an acoustic "sweet spot" within the environment. The term "sweet spot" as used herein refers to a location within an acoustic environment used for calculating phase delays, amplitudes, and/or other characteristics of signals sent to the speakers.

Some audio output systems may use a calibration microphone to set a desired sweet spot location. For example, a user may calibrate a television and an AV receiver to set a sweet spot centered at a sofa. Calibration may involve outputting test sounds via speakers arranged within the environment, detecting the test sounds at the selected sweet spot location via the calibration microphone, algorithmically locating the calibration microphone in the room, and selecting a phase delay, amplitude, echo cancellation and/or other characteristic for each speaker signal to form the sweet spot at the desired location. However, such a calibration process provides a static sweet spot. If the user wishes to reposition the static sweet spot to another location, the user must perform another manual calibration process. Recalibration may be time-consuming and interruptive to an audio presentation being consumed, and the resulting sweet spot will also be static.

Some audio systems may be configured to direct audio output towards a user based upon a user input of a voice command. For example, an audio output system may receive audio signals arising from a user via a microphone array, determine whether the audio signals received include a voice command to steer audio, determine a location of the sound source based on the audio signals received (e.g. by receive beamforming), and reposition the sweet spot based upon the determined location of the sound source. However, determining the location of the user solely via audio signals detected by a microphone array may be too time-intensive to update frequently as a user moves around within the space. Further, having to speak a voice command each time the audio is repositioned may detract from an audio consumption experience. Other methods of tracking a user, such as wearing a locator beacon, also may be cumbersome.

Thus, examples are disclosed that relate to adjusting a location of a sweet spot of an audio system during use based upon a real-time location of a tracked object (e.g. a user). In some examples, a remote service receives sensor data or sensor-derived data from multiple sensors in a use environment including a depth image sensor, and fuses the data into a shared coordinate system. Data received from the depth image sensor may comprise, or be used to generate, a map of the use environment that can be shared with other devices within the use environment, such that each device uses the shared coordinate system. Further, the depth image data and/or other sensor data may be used to track the location of a tracked user in the use environment, as well as other tracked objects, and updated locations of the user (and other objects) may be published to the remote service by sensing devices that detect changed locations. The remote service then may send notifications regarding updated locations of the user to audio-providing devices. The use of a depth image sensor plus one or more other location sensors in the environment may allow a location of the user to be tracked even when the user is out of view of the depth image sensor, without user intervention to relocate the sweet spot. Upon receipt of a notification that a tracked user with which a sweet spot is associated has changed locations, the audio-providing device(s) may adjust signals provided to speakers such that the sweet spot is maintained suitably close to the location of the user. In other examples where headphones are used to output audio, the audio-providing device may adjust the signals provided to each speaker of the headphones such that the headphones receive different audio signals based on location within the use environment, for example, by using a head-related transfer function. In some examples, the locations of multiple users (e.g. different users) may be tracked, and different audio streams or different sweet spots provided for each user.

FIG. 1A schematically shows an example use environment 100 for audio consumption. While the environment 100 is depicted as a residential setting, a use environment may take any other suitable form, such as business locations. In this example, the environment 100 includes an audio-providing device 102 (e.g. a game console), a television 104, and speakers 106A-106D. While the use environment 100 has a single display device, in other examples a use environment may not include a display device, or may include a plurality of display devices positioned at different locations in the use environment. In other examples, the audio-providing device 102 may be integrated into a television, or may take the form of a stand-alone audio system.

The use environment 100 further comprises a first image sensor 108 positioned at a fixed location in the use environment 100. In this example, the first image sensor 108 is positioned atop the television 104. In other examples, the first image sensor 108 may be integrated with the television 104 (e.g. within a common enclosure) or positioned elsewhere in the use environment 100. The first image sensor 108 comprises a depth image sensor, and may also comprise a two-dimensional image sensor (e.g. an RBG camera or a grayscale camera), as well as other sensors such as a microphone array. In some examples, the first image sensor 108 may be configured to rotate/pan within a limited angular range from an initial orientation. In any instance, the first image sensor 108 has a substantially fixed perspective range, as indicated by dotted lines 110.

The first image sensor 108 obtains depth image data of the use environment 100. In some examples, the first image sensor 108 is coupled to a computing device (e.g. game console 102) or integrated with a computing device (e.g. within a common enclosure) configured to determine a surface reconstruction mesh or other depth map of the use environment 100 based upon the depth image data. The computing device also may identify one or more objects within the depth image data (e.g. via one or more classification algorithms). For example, the computing device may be configured to detect people in the use environment 100 (e.g. user 111), and fit a skeletal model to the user 111 in which the user 111 is represented by collection of nodes that represent locations of the human body and that are connected in a form that approximates the form of the human body. The locations of the nodes in the use environment 100 may be expressed in the coordinate system of the first image sensor 108. The first image sensor 108 also may be configured to recognize one or more additional objects within the use environment 100, such as a sofa 105, and determine locations of such objects in the coordinate system. The computing device may provide the depth map data and object location data to the remote service. In other examples, the first image sensor 108 may provide location data in the form of raw image data to an external computing device and/or directly to the remote service or a network edge device for object identification and/or other processing.

The remote service receives and stores identification and location data for each object, as well as the mesh data and/or other depth image data for the use environment. The remote service also may perform classification, either in addition to or in place of, the classification performed by the computing device local to the first image sensor 108, to identify objects in the use environment. Each object identified, both by the local computing device and the remote service, may be assigned an object identification (ID), which may be stored along with the object type and coordinate location of the identified object. The identified objects may comprise detected human forms, whether as skeletal representations or other suitable representation.

Information regarding the map of the use environment 100, and locations of identified objects within the use environment 100, may be accessed by other devices in the use environment 100, either by pulling the data via query or subscribing to a data push service. In this manner, different devices and/or sensors within the use environment 100 may track the locations of objects in the use environment 100, using the same coordinate system via the shared map, as the objects change location.

For example, audio-providing devices within the use environment may query for, or subscribe to receive notifications for, information regarding a current location of each of one or more tracked users in the use environment. The audio-providing devices then may modify audio output based upon the current location of the tracked users. This may allow one or more sweet spot locations to be adjusted to follow one or more corresponding users being tracked as objects, e.g. by modifying phase delays and/or an amplitudes of audio signals provided to speakers based on current location of each user. In the example of FIG. 1A, the game console 102 modifies audio signals output via speakers 106A-106D based on a location of the user 111, as determined via data acquired by the first image sensor 108, such that an acoustic sweet spot 112 is repositioned based upon a location of the user 111.

In some instances, a user 111 may move outside the perspective 110 of the first image sensor 108 or otherwise become occluded from view of the first image sensor 108 during audio consumption. In such instances, persistent tracking of the user 111, and association of the sweet spot with the user 111, may be lost. Thus, to track a user when the user is outside of the view of the first image sensor 108, data from another sensor in the use environment may be used. For example, the depicted use environment 100 comprises a second image sensor 114 positioned at a different fixed location in the use environment 100 than the first image sensor 108, where a perspective of the second image sensor 114, indicated by dotted lines 116, at least partially overlaps the perspective 110 of the first image sensor 108. In FIG. 1A, the second image sensor 114 is positioned substantially opposite the first image sensor 108 such that the combined sensing system captures depth image data of the entire use environment 100. In other examples, the second image sensor 114 may be positioned at any other suitable location within the use environment.

Similar to the first image sensor 108, the second image sensor 114 obtains depth image data of the use environment 100, which is processed by a computing device integrated with or connected to the second image sensor 114 to determine a surface reconstruction mesh or other depth map of the imaged space. The second image sensor 114 also may detect objects such as people in the use environment 100.

Such data then may be provided to the remote service. In other examples, raw image data from the second image sensor 114 may be sent to the remote service or a network edge device for such processing.

The remote service may be configured to fuse the sensor data from the first image sensor 108 and the second image sensor 114, for example, by calibrating a spatial relationship of the first image sensor 108 and the second image sensor 114 using depth image data received from each sensor. Such spatial calibration may allow a coordinate transformation matrix to be determined that relates the coordinate systems of the first and second image sensors 108, 114, thereby allowing the image sensors to share a common coordinate frame. In other examples, the second image sensor may download depth map data from the remote service, rather than building its own map, fill in areas of the map that are not viewable by the first image sensor 108, and send this data to the remote service for addition to the map of the use environment. The remote service thus may use data from the second image sensor 114 to map portions of the use environment 100 out of view or occluded from view of the first image sensor 108, and to update a location of an object when the object is in such portions of the use environment 100. This may help to prevent loss of tracking when a user or other tracked object is not detectable in image data acquired by one image sensor. In other examples, instead of or in addition to using a remote service, a local computing device may receive and fuse data from multiple location sensors in a use environment.

Figure 1B:
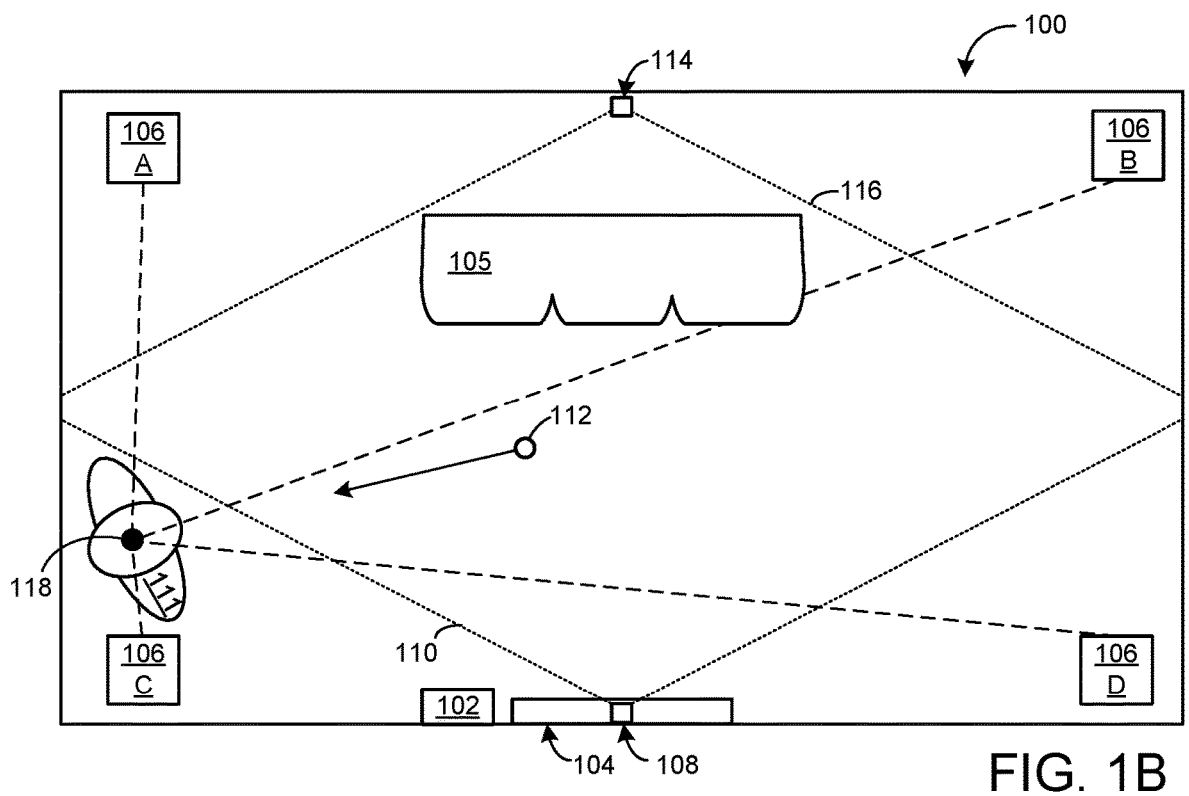

FIG. 1B illustrates an example scenario in which the user 111 moves to a location of the use environment 100 out of view of the first image sensor 108 and within view of the second image sensor 114. Based on location data acquired by the second image sensor 114, the audio-providing device 102 receives a notification from the remote service regarding the current location of the user 111. In response, the audio-providing device 102 modifies an audio signal to be provided to the speakers 106A-106D to reposition the acoustic sweet spot from a prior location 112 of the user 111 to a location based upon the current location 118 of the user 111.

Figure 2A:
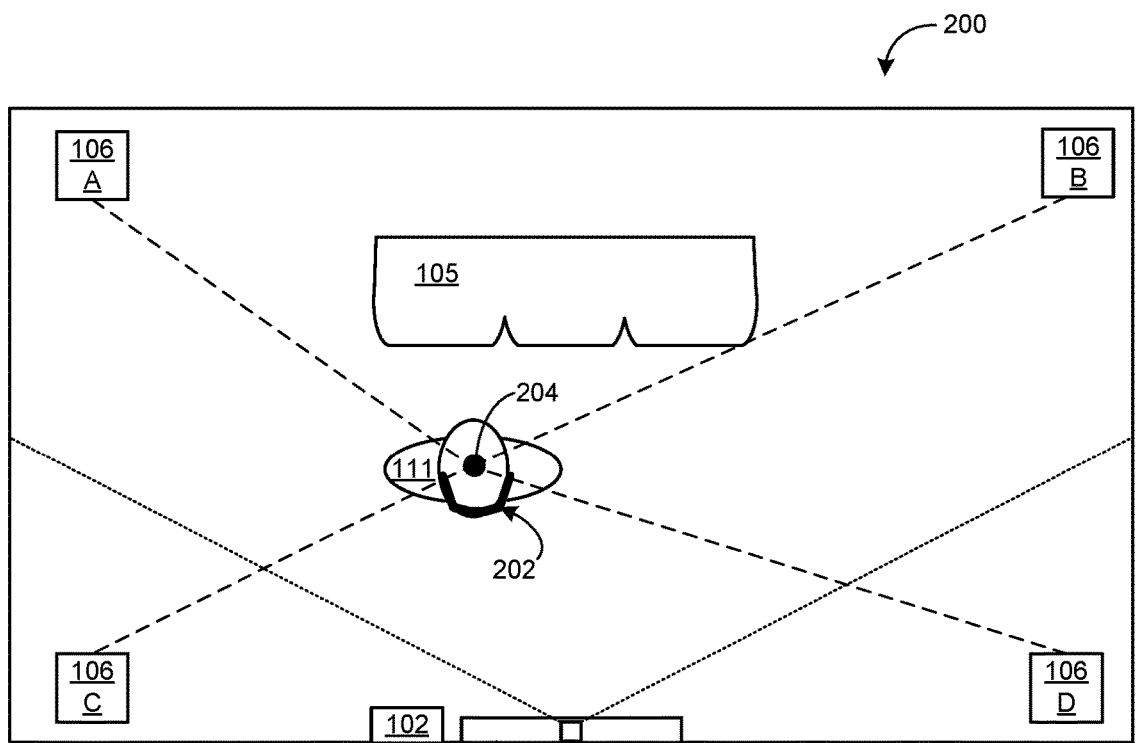
FIGS. 2A and 2B schematically depict another example use environment for providing a moveable acoustic sweet spot.

The above-described examples utilize image sensors in fixed locations relative to a use environment. In other examples, non-fixed image sensors and/or sensors other than image sensors may be used to track an object location to position a sweet spot in a location not viewable by a first image sensor in the use environment. FIG. 2A schematically depicts an example use environment 200 comprising the audio-providing device 102, the television 104, the speakers 106A-106D, and the first image sensor 108. The use environment 200 further comprises a head-mounted device 202 worn by the user 111.

The head-mounted device 202 comprises an outward-facing image sensor configured to obtain depth image data and two-dimensional image data. Such image data, potentially in combination with other sensor data from other sensors of the head-mounted device 202, may be used to build a depth map (e.g. a surface reconstruction mesh) of the use environment 200. The resulting depth map may be provided to the remote service, which may fuse the map with that obtained from the first image sensor 108, thereby filling in areas of the map that are not viewable by the first image sensor 108. In other examples, the head-mounted device 202 may download map data from the remote service, rather than building its own map, and fill in areas of the map that are not viewable by the first image sensor 108, and send this data to the remote service for addition to the map of the use environment.

Further, the image data from the image sensor of the head-mounted device 202 may be used to track its own location in the environment, such as by fitting a current view of the use environment to the depth map data, and may publish its location to the remote service. The head-mounted device 202 further may publish coordinates for objects in the use environment 200 that are detected to have changed locations and/or that are out of view of the first image sensor 108 (e.g. speakers 106C and 106D). The head-mounted device 202 additionally or alternatively may include other sensors to help locate user 111 within the use environment 200, such as a global positioning sensor and/or an inertial motion sensing system.

Figure 2B:
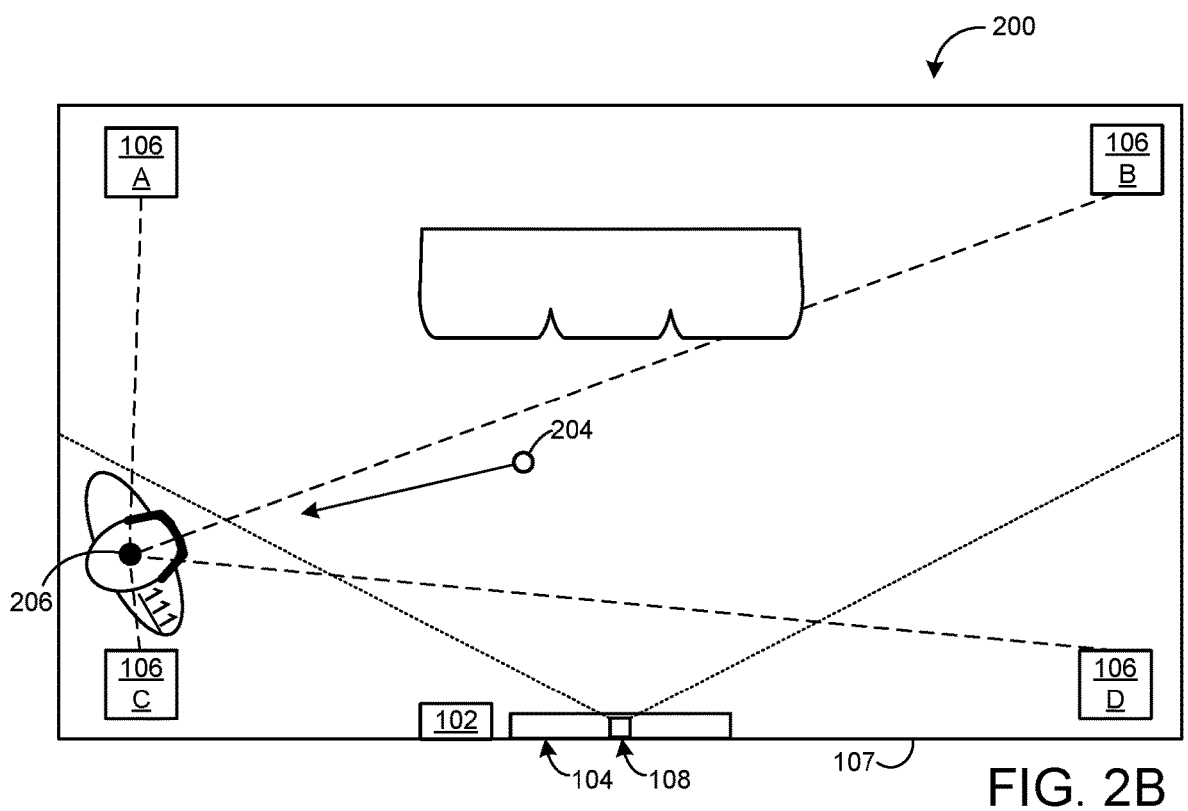

In FIG. 2A, the audio-providing device 102 modifies an audio signal for output via the speakers 106A-106D based on a location of the user 111 as determined by data acquired from the first image sensor 108, to provide a sweet spot 204 at a location based upon the location of the user 111. In some examples, the head-mounted device 202 may output audio to the user 111 via headphones of the head-mounted device, for example, to provide user-specific audio via the headphones, in addition to or alternatively to audio output via the speakers 106A-106D. In FIG. 2B, the user 111 moves to a location out of view of the first image sensor 108 and the head-mounted device 202 reports the current location of the user 111 to the remote service. The audio-providing device 102 receives, from the remote service, a notification regarding the current location of the user 111 and modifies the audio signal to reposition the sweet spot 204 to a location 206 based on the current location of the user 111.

As mentioned above, current speaker calibration processes generally use a microphone to help calibrate an arrangement of speakers. However, via depth data of the use environment as described herein, calibration may be performed without a microphone. For example, the locations of the speakers 106A-106D in the use environment may be determined by depth image data, and the determined speaker locations may be used to calibrate the speakers computationally. Calibrating the speakers may comprise, for example, locating surfaces in the use environment (walls, ceiling, floor, furniture, etc.), obtaining estimates of surfaces and sound qualities for each surface, and configuring a sweet spot based upon this information.

Other mobile sensors than a camera of a wearable device also may be used to provide location data for repositioning a sweet spot. For example, a global positioning satellite (GPS) system sensor and/or an inertial motion sensor of a wearable or other mobile device carried by a user (e.g. a smart phone or tablet) may be used. Further, a camera of a smart phone, tablet, or other mobile computing device also may be used.

Figure 3:
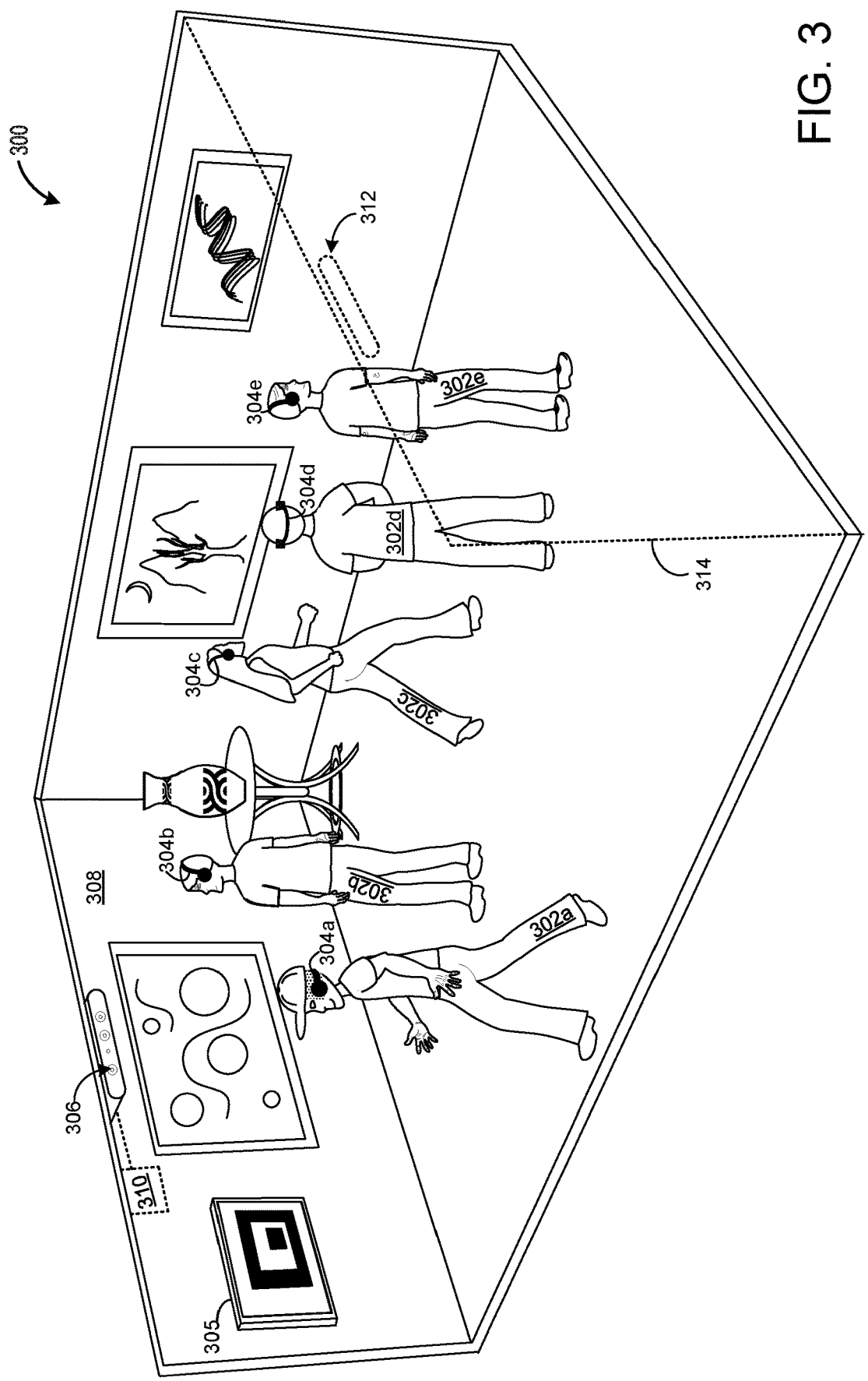
FIG. 3 depicts an example use environment for providing different audio streams to each of two or more users based upon a location of each user.

In some examples, an audio output system may provide different audio streams to different people based upon a location of each person. FIG. 3 depicts an example use environment 300 in the form of an art gallery in which users 302a-302e each wear headphones 304a-304e to receive an audio stream corresponding to a nearby exhibit. For example, when the user 302a is proximate to a painting 305, the user 302a may receive an audio stream describing information regarding the painting 305. The audio may change to information regarding a different painting when the user is proximate to the different painting. In other examples, a use environment may comprise a common multi-speaker system to provide multiple sweet spots of the same audio stream (e.g. a sweet spot for each user), or separate beamformed audio streams.

As such, the use environment 300 comprises a first image sensor 306 having a fixed location along a wall 308. In this example, the first image sensor 306 is peripheral to an audio-providing device 310, such as a computer. The first image sensor 306 captures depth image data of the use environment 300 and optionally may also capture two-dimensional image data. The audio-providing device 310 receives from the first image sensor 306 location data comprising a location of each sensed person. In FIG. 3, the location data received from the first image sensor 306 may comprise a location of user 302a, a location of user 302b, and a location of user 302c. Based on the location data received, the audio-providing device 310 outputs separate audio streams to each user 302a-302c based on a respective location (e.g. a proximity to an exhibit) of each user 302a-302c.

While the users 302a-302c may be within view of the first image sensor 306, the users 302d and 302e may be occluded from view of the first image sensor 306, for example, by other users 302a-302c positioned between the first image sensor 306 and the users 302d-302e. Thus, the environment 300 comprises a second image sensor (indicated by dotted lines 312) having a fixed location along an opposing wall (indicated by dotted lines 314) as the first image sensor 306. While the first image sensor 306 and the second image sensor 312 are positioned substantially opposite one another in this example, the first image sensor 306 and the second image sensor 312 may each comprise any other suitable location, in other examples, and may image substantially the entirety of the use environment 300.

The second image sensor 312 captures depth image data and also may capture two-dimensional image data. In this example, the second image sensor 312 is configured to report location data directly to the remote service via a network connection. In other examples, the second image sensor 312 may be configured to report location data to the audio-providing device 310 and/or another computing device within the environment 300. Image data acquired by the second image sensor 312 may help to prevent locations within the environment 300 where a location of a person cannot be tracked, for example, due to a fixed perspective of the first image sensor 306 and/or occlusion by another person or other object. For example, the second image sensor 312 may send location data comprising a location of user 302d and a location of user 302e to the remote service. While users 302d and 302e are each occluded from view of the first image sensor 306, the audio-providing device 310 may receive a notification(s) regarding the location of the user 302d and the location of the user 302e, and may output separate audio streams to the respective headphones 304d, 304e associated with the users 302d, 302e based on the notification received.

Figure 4A:
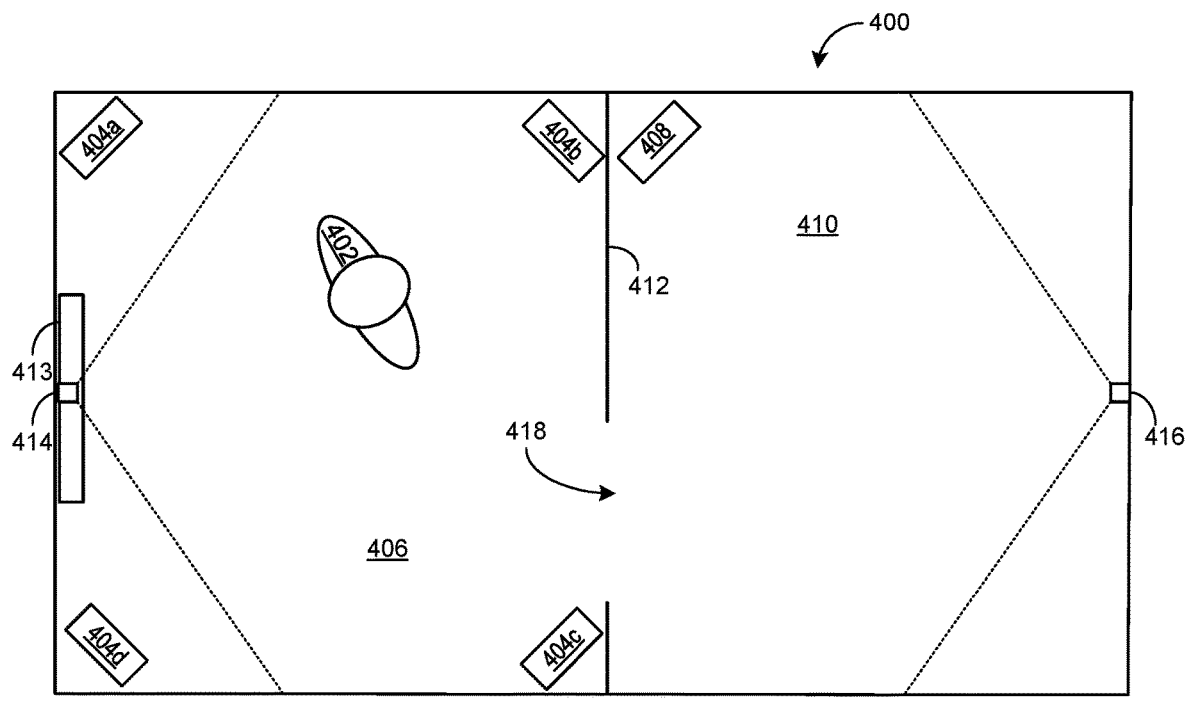
FIGS. 4A and 4B schematically depict another example use environment for modifying an audio signal based upon user location.
Figure 4B:
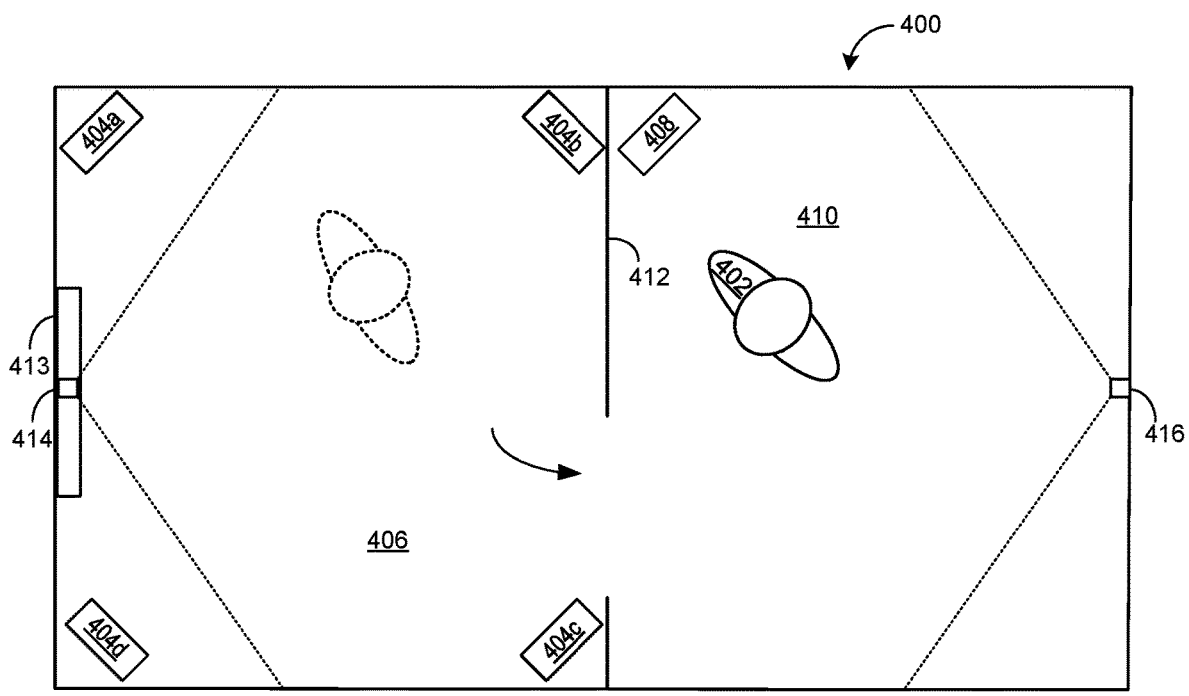

In some examples, an audio output system may be configured to pause or end audio output to one or more speakers in a room when a person leaves the room. Likewise, an audio output system may be configured to begin or resume providing audio to one or more speakers in a room when a person enters the room. FIGS. 4A and 4B schematically depict an example use environment 400 for adjusting audio output to one or more speakers based on a person 402 entering and/or leaving a room. The use environment 400 comprises speakers 404a-404d positioned within a first room 406 and a speaker 408 positioned within a second room 410, where the second room 410 is located on an opposing side of a wall 412 as the first room 406.

The use environment 400 further comprises a media presentation device 413, a first image sensor 414 having a fixed location within the first room 406, and a second image sensor 416 having a fixed location within the second room 410. The media presentation device 413 modifies audio signals to be output via the speakers 404a-404d based on a location of the person 402 as determined by data acquired from the first image sensor 414. In FIG. 4B, the person 402 has left the first room 406 and entered the second room 410 via a doorway 418. The media presentation device 413 receives a notification regarding an updated location of the person 402 as determined from data acquired by the second image sensor 416. In response to receiving the notification, the media presentation device 413 provides an audio signal to speaker 408. The media presentation device 413 may continue to provide audio to speakers 404a-404d, or cease providing audio to these speakers.

Figure 5:
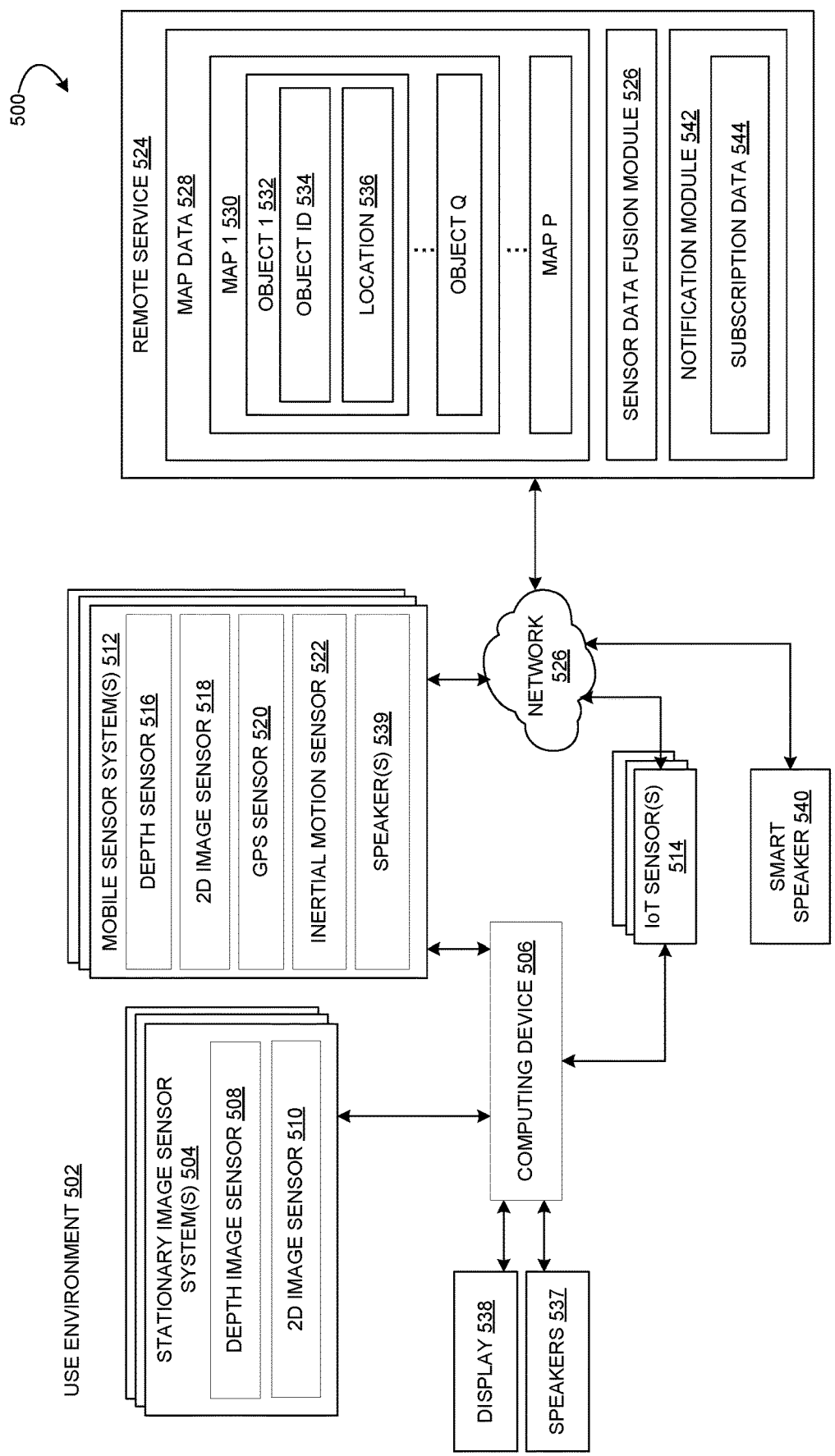
FIG. 5 is a block diagram illustrating an example system for tracking a location of a user within a physical space and modifying an audio signal provided to one or more speakers based on the user location.

FIG. 5 is a block diagram illustrating an example system 500 for identifying and tracking locations of objects within a use environment 502. Example use environments include residential settings (e.g. rooms of a home), other indoor spaces (e.g. museum, office building, retail store, warehouse, etc.), and outdoor spaces (e.g. parks, outdoor exhibits, etc.). Use environment 502 is not necessarily contained within a physical boundary, but instead may be defined by an operating range of one or more sensing devices and/or media presentation devices within the use environment 502.

The system 500 comprises two or more sensors for sensing object locations, where at least one sensor comprises a stationary image sensor. The term "stationary image sensor" as used herein refers to an image sensor having a fixed location within the use environment 502. In some examples, a stationary image sensor may be configured to rotate/pan within a limited angular range from an initial perspective of the use environment 502. Each sensor within the use environment 502 may be configured to directly communicate with a remote service, or may communicate with an intermediary computing device local to the use environment 502.

In the depicted example, the system 500 comprises a stationary image sensor system 504 in communication with a computing device 506, which may be integrated with or separate from the stationary sensor system 504. Example computing devices include televisions, game consoles, desktop computers, laptop computers, and mobile computing devices (e.g. wearable computing devices, smart phones, tablets, etc.).

Stationary image sensor system 504 comprises a depth image sensor 508 and a two-dimensional image sensor 510. Example depth image sensors include a structured light camera, a time-of-flight camera, and a stereo camera arrangement. Example two-dimensional image sensors include an RBG camera and a grayscale camera. In some examples, a stationary image sensor system may omit the two-dimensional image sensor 510.

As mentioned above, system 500 comprises a second sensor, in addition to stationary image sensor system 504, for sensing object locations. FIG. 5 illustrates various examples of such sensors, including one or more other stationary image sensor systems, one or more mobile sensor systems 512, and one or more IoT (Internet of Things) sensors 514. Where the second sensor takes the form of a second stationary image sensor system, the second stationary sensor system may have any suitable sensors, including a depth image sensor and optionally a two-dimensional image sensor, similar to the stationary image sensor system 504. A stationary image sensor system 504 further may include other location sensors not shown here, such as a directional microphone array.

A mobile sensor system 512, where included, may take any suitable form, including but not limited to an augmented reality head-mounted display or other wearable device (e.g. a wrist-worn device), a mobile phone, a tablet, a laptop computer, etc. An augmented reality head-mounted display may comprise an outward facing depth sensor 516 and optionally a two-dimensional image sensor 518. Other types of mobile devices also may comprise image sensors. The mobile sensor system 512 further may include a GPS sensor 520 and/or one or more inertial motion sensors 522 (e.g. accelerometer, gyroscope, and/or magnetometer).

As the mobile sensor system(s) 512 moves within the use environment 502, image data acquired by one or more image sensors of the mobile sensor system 512 may be used to map portions of the use environment 502 out of view of the stationary image sensor system 504. Further, other sensors of the mobile sensor system 512 (e.g. inertial motion sensors 522 and/or GPS sensors 520) may be used to resolve a location of a user when the user is out of view of a fixed-location image sensor.

The IoT sensors 514, where included, may comprise one or more stand-alone sensor devices that are not incorporated into wearable or other mobile device and that are configured to communicate directly with a network access point or IoT hub device, rather than through another computing device. Examples of suitable IoT sensors include depth image sensors, two-dimensional image sensors, and microphones (including directional microphone arrays).

Image data from any of these image sensors may be used to map the use environment 502, and to detect and classify objects in the use environment 502. In some examples, depth image data may be processed to identify one or more bundles of pixels (e.g. a blob) within the depth image data. A shape, size, color, texture, and/or any other suitable observation regarding the bundle of pixels may be compared to a library of known objects to obtain a probable object classification. Coordinates locations may be assigned to classified objects based upon a location in the field of view and a depth value for the object. For example, where a classified object comprises a skeletal model for a user identified within the image data, a coordinate location may be assigned to each node of the skeletal model. In a case of a mobile image sensor, the computing system may perform localization and mapping analysis while acquiring data to thereby generate a spatial map of the use environment 502 including the identified/classified objects. Each identified object may be assigned an ID.

The stationary image sensor(s) and other image sensor(s) in the use environment 502 may communicate with a remote service 524 over a network 526 to send and receive map data and object data. The remote service 524 may take the form of a cloud-based service. The remote service may fuse image sensor data (e.g. process depth maps and object IDs, or raw image data) received from various image sensors in the use environment 502 to form a shared depth map of the use environment 502, including shared object IDs. Such a shared depth map then may be used by sensors in the environment to track and update object locations. The depicted remote service 524 comprises a sensor data fusion module 526 configured to receive image sensor data (processed into a depth map, or raw) from the stationary image sensor(s) 504, 514 and other location sensor data, and fuse the data into a shared coordinate system. For example, where the other location sensing data is other depth image data, the other depth image data is fused with depth image data from the stationary image sensor(s) 504, 514. The sensor data fusion module 526 also may receive and fuse other sensor data, such as GPS data for an object, inertial motion data, etc.

Output from the sensor data fusion module 526 is stored as map data 528 by the remote service 524. The depicted map data 528 comprises one or more maps, indicated as map 1 through map P, each corresponding to a different use environment. Map 1, for example, may comprise a map of a first use environment 502, and maps 2 through P may comprise maps of other use environments. In some examples, map data 528 may be stored in a user account for access only by that user account. In other examples, a map may be accessible by multiple user accounts, or unrestricted (so that anyone can access the map).

Each map 1 through P further comprises information regarding one or more objects identified within the mapped use environment, indicated as objects 1 through Q in the first map 530. Each object 532 of the first map 530 comprises an object ID 534 and a coordinate location 536 indicating where the object 532 was most recently detected within the use environment 502. The object ID 532 may comprise an identifier that distinguishes it from other objects in the use environment 502.

Continuing with FIG. 5, the use environment 502 comprises one or more audio-providing devices configured to output signals to one or more speakers in the use environment 502. In FIG. 5, example audio-providing devices include the computing device 506 (which is connected to speakers 537 and a display 538), a mobile device that provides audio output to one or more speakers 539 (e.g. built-in speakers or headphones), and a smart speaker 540 configured to directly communicate with the remote service 524. As described above, an audio-providing device within the use environment may obtain object location data from the remote service 524 to determine where to position a sweet spot in the use environment 502, and/or how to modify signals provided to speakers.

An audio-providing device may obtain object location information either by pulling the location data from the remote service 524, or receiving location data pushed from the remote service 524. In the depicted example, the remote service 524 comprises a notification module 542 storing subscription data 544 for one or more audio-providing devices within each mapped use environment. The subscription data 544 may comprise information regarding identities of and/or classifications of objects in the use environment 502 for which an audio-providing device has subscribed to receive notifications. An audio-providing device may subscribe to the notification module by request, or based upon being located in the use environment 502.

As mentioned above, sensors in the use environment 502 share map data, including object IDs and location data. When a sensor system detects that a person or other tracked object has moved compared to object location data most recently obtained from the remote service, the sensor system may send an updated location to the sensor data fusion module 526. This module 526 may then update the location of the object in the map. Upon this update occurring, the notification module 542 may send a notification regarding the updated location to any audio-providing devices that subscribe to receive updates for the object. In some examples, the remote service 524 also may determine audio signals to provide based upon an object location. In such examples, the notification may include parameters for adjusting the phase delay, amplitude, and/or any other suitable parameters of audio signals to be provided to speakers in the use environment.

Figure 6:
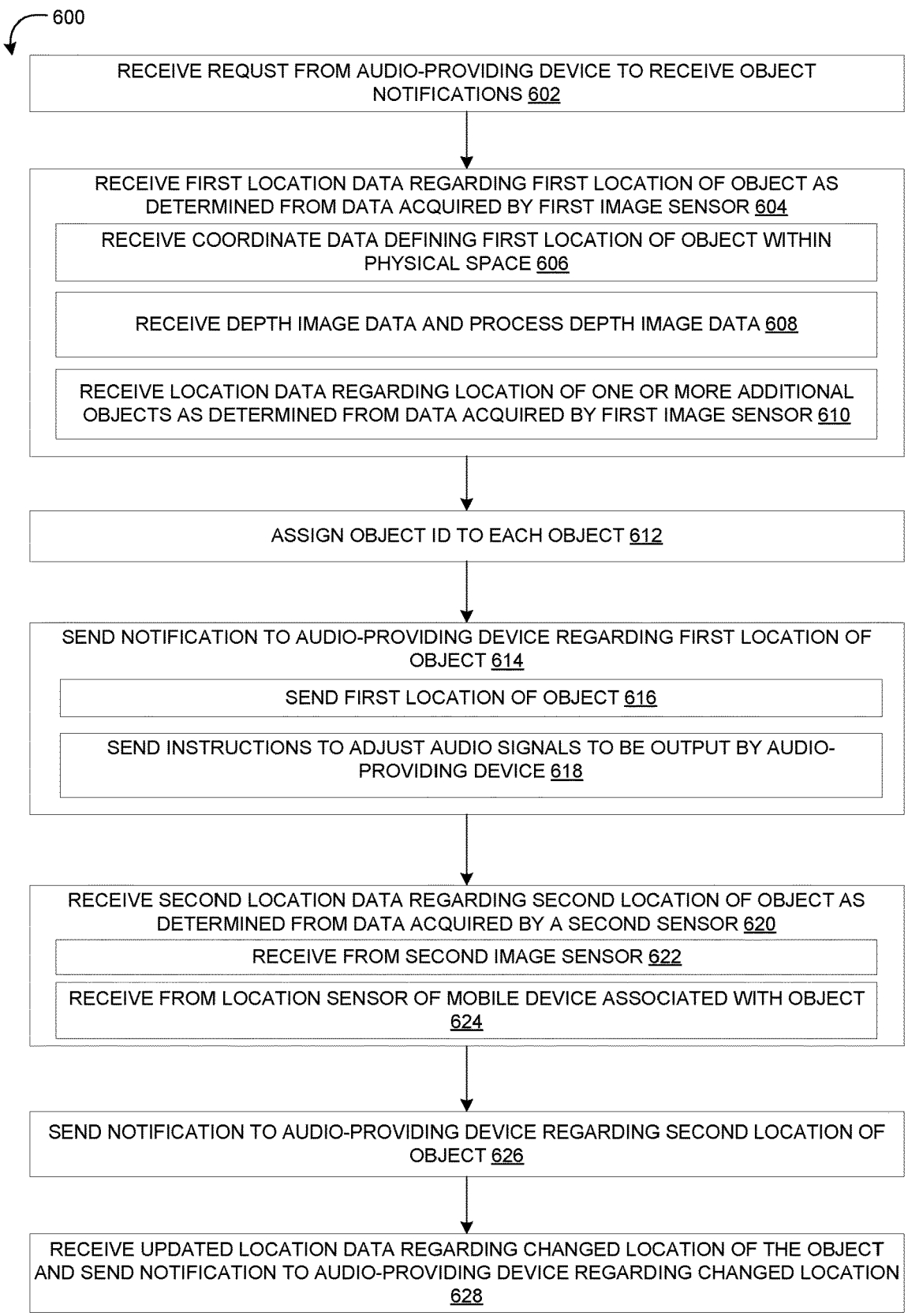
FIG. 6 is a flow diagram illustrating an example method for notifying an audio-providing device regarding an object location within a physical space.

FIG. 6 shows a flow diagram illustrating an example method 600 for notifying an audio-providing device regarding a location of an object. Method 600 may be implemented as stored instructions executable by a logic subsystem of a remote service that receives data acquired by multiple sensors and/or devices within a use environment, such as the remote service 524. Method 600 also may be implemented by one or more computing devices local to a use environment, in addition or alternative to a remote service.

At 602, method 600 comprises receiving a request from an audio-providing device for notifications regarding object locations. In other examples, an audio-providing device may pull data instead of requesting for push notifications.

At 604, method 600 comprises receiving first location data regarding a first location of an object as determined from data acquired by a first image sensor having a fixed location within a physical space. The first location data may describe a first location of any object within the physical space, including a person. In some examples, the location data comprises coordinate data defining the first location of the object within a shared coordinate system of a physical space, as indicated at 606. The location data further may comprise a depth map of a portion of the location that can be viewed by the first image sensor. In other examples, the location data comprises raw sensor data, such as depth image data, acquired by the first image sensor. In such examples, the first location of the object is determined by processing the raw sensor data, as indicated at 608, to determining a depth map and object locations within the depth map based upon the sensor data. In some examples, such as where multiple people are in a use environment, receiving the location data may comprise receiving location data for one or more additional objects, as indicated at 610.

Method 600 further comprises, at 612, assigning an object ID to each object identified in the first location data. Multiple sensors within the physical space then may access the map and determine a most recently detected location for each object ID being tracked.

Based on the location data received, method 600 comprises, at 614, sending a notification to an audio-providing device regarding the first location of the object. The notification may comprise any suitable information, including the first location of the object, as indicated at 616. The audio-providing device may use the first location of the object to modify an audio signal based on the first location of the object. In other examples, the notification may comprise instructions to adjust an audio signal to be output by the audio-providing device based on the first location of the object, as indicated at 618. In such an example, the remote service may determine parameters related to one or more of a phase delay and an amplitude of an audio signal to be output based upon the first location of the object.

Continuing, at 622, method 600 comprises receiving second location data regarding a second location of the object as determined from data acquired by a second sensor, where the second location of the object is out of view of the first image sensor. The second location of the object may be out of view of the first image sensor due to occlusion or due to a limited perspective of the first image sensor, as examples.

In some examples, the second location may be received from a second image sensor having a second fixed location within the physical space, as indicated at 624. In other examples, the second location data may comprise image data received from a mobile device, such as a head-mounted device. The second location data may comprise coordinate data, raw image data, partially processed image data, and/or any other suitable data. S also, such as an inertial motion sensor or GPS sensor. In response, the remote service may update the map to reflect an updated location of the object within the physical space. The second sensor also may obtain location data for one or more additional objects within the physical space, and the remote service may update the map to include the one or more additional objects and a corresponding location for each object.

At 626, method 600 comprises sending a notification to the audio-providing device regarding the second location of the object so that the audio-providing device may update the sweet spot based upon the second location. The remote service may continue to receive updated location information, and in response continue to update the object location information and notify an audio-providing device(s) regarding the updated location, as indicated at 628. In this manner, a location of the sweet spot may be updated in real time as a person moves within the use environment.

Figure 7:
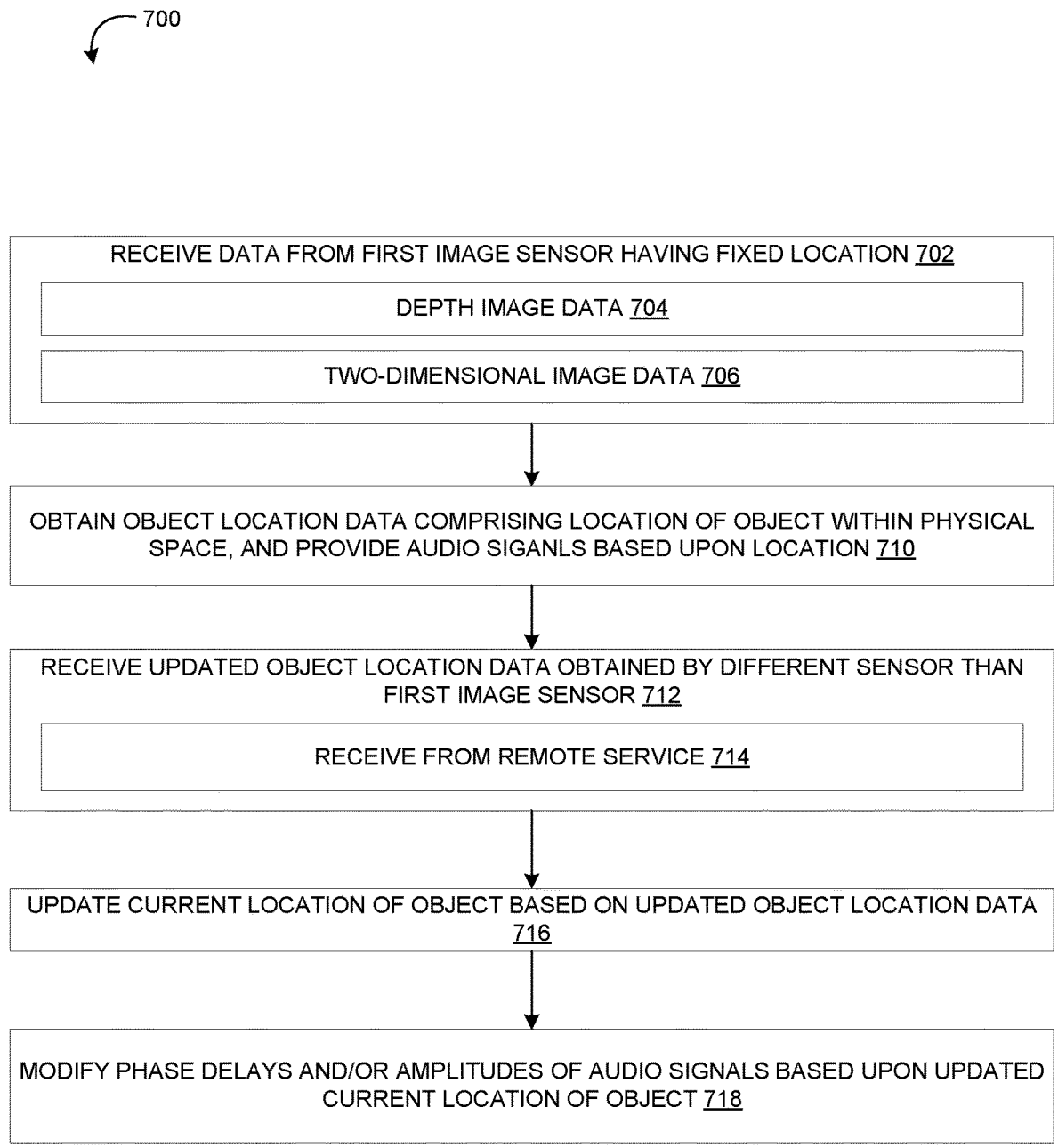
FIG. 7 is a flow diagram illustrating an example method for modifying audio signals based on a location of a user.

FIG. 7 shows a flow diagram illustrating an example method 700 for an audio-providing device to modify audio signals based on a location of a tracked object. Method 700 may be implemented as stored instructions executable by a logic subsystem of a computing device that outputs to speakers. At 702, method 700 comprises receiving data from a first image sensor having a fixed location within a physical space. The data received may include raw or processed depth image data 704 (e.g. a depth map of a viewable portion of the physical space), and two-dimensional image data 706 in some examples.

At 708, method 700 comprises obtaining object location data regarding a location of the object within the physical space. The object location may comprise coordinate locations of each of one or more objects within the physical space as determined from data acquired by the first image sensor. As an example, a coordinate location may correspond to a node on a skeletal model of a user. Based on the location of the object within the physical space, the audio-providing device provide audio signals to speakers to position a sweet spot based upon the location of the object.

At 712, method 700 comprises receiving updated object location data obtained by a different sensor than the first image sensor. In some examples, receiving the updated object location data may comprise receiving data from a second image sensor having a second fixed location within the physical environment. In other examples, receiving the updated object location data may comprise receiving data from another sensing device within the physical environment, such as a mobile device. In yet other examples, receiving the updated object location data comprises receiving data from a remote service, where the remote service receives data from one or more other sensors in the physical space, as indicated at 714.

At 716, method 700 comprises updating a current location of the object based on the updated object location data received. For example, updating the current location of the object may comprise updating a depth map to reflect the current location of the object. Based on the updated current location of the object, method 700 comprises, at 718, modifying one or more of a phase delay and/or and amplitude of each of a plurality of audio signals. In this manner, the audio-providing device moves the acoustic sweet spot to follow movement of the object within the physical space.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
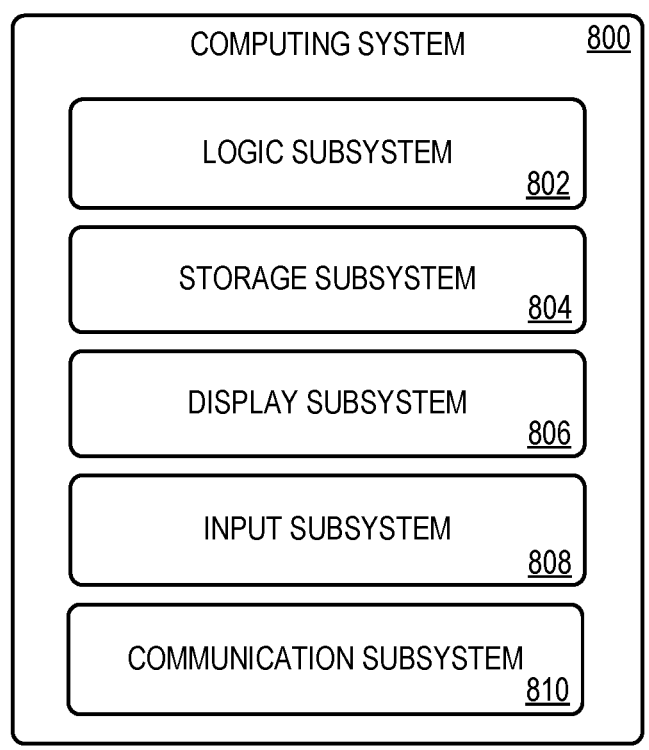
FIG. 8 is a block diagram illustrating an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program," may be used to describe an aspect of computing system 800 implemented to perform a particular function. In some cases, a module or program may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a computing system, comprising a logic subsystem comprising one or more processing devices, and memory storing instructions executable by the logic subsystem to receive first location data regarding a first location of an object in a space as determined from data acquired by a first image sensor having a fixed location within the space, based on receiving the first location data, send a notification to an audio-providing device regarding the first location of the object as determined from the data acquired by the first image sensor, receive second location data regarding a second location of the object in the space as determined by a second sensor, the second location being outside of a view of the first image sensor, and based on receiving the second location data, send a notification to the audio-providing device regarding the second location of the object as determined by the second sensor. In such an example, the second sensor may additionally or alternatively comprise a second image sensor having a second fixed location within the space. In such an example, the second sensor may additionally or alternatively comprise a location sensor of a mobile device associated with the object. In such an example, the instructions may additionally or alternatively be executable to receive location data regarding a location of each of one or more additional objects within the space as determined from the data acquired by the first image sensor. In such an example, the instructions may additionally or alternatively be executable to receive updated location data regarding a changed location of the object as determined by data acquired from one or more of the first image sensor and the second sensor, and send a notification to the audio-providing device regarding the changed location of the object. In such an example, the instructions may additionally or alternatively be executable to send instructions to the audio-providing device to adjust an audio signal to be output by the audio-providing device based on the second location of the object. In such an example, the instructions to adjust the audio signal may additionally or alternatively comprise instructions regarding one or more of a determined phase delay and a determined amplitude for the audio signal. In such an example, the instructions may additionally or alternatively be executable to receive the first location data by receiving coordinate data defining a coordinate of the first location of the object within the space. In such an example, the instructions may additionally or alternatively be executable to receive the first location data by receiving depth image data, and the instructions may additionally or alternatively be executable to determine the first location of the user in the space from the depth image data.

Another example provides a method implemented by a computing system, the method comprising receiving first location data regarding a first location of an object in a space as determined from data acquired by a first image sensor having a first fixed perspective of the space, based on receiving the first location data, sending a notification to an audio-providing device regarding the first location of the object as determined from the data acquired by the first image sensor, receiving second location data regarding a second location of the object as determined from data acquired by a second image sensor having a second fixed perspective of the space, the second location of the object being outside of a view of the first image sensor, and based on receiving the second location data, sending a notification to the audio-providing device regarding the second location of the object as determined from the data acquired by the second image sensor. In such an example, the method may additionally or alternatively comprise receiving from the audio-providing device a request to receive notifications regarding a location of the object. In such an example, receiving the first location data may additionally or alternatively comprise receiving data regarding a location of each of one or more additional objects in the space as determined from data acquired by the first image sensor. In such an example, the method may additionally or alternatively comprise assigning an object identification for each of the object and the one or more additional objects in the space. In such an example, sending the notification to the audio-providing device may additionally or alternatively comprise sending instructions to the audio-providing device to adjust an audio signal to be output by the audio-providing device based on the second location of the object. In such an example, the instructions to adjust the audio signal may additionally or alternatively comprise instructions regarding one or more of a determined phase delay and a determined amplitude for the audio signal.

Another example provides a computing device comprising a communication subsystem, a logic subsystem comprising one or more logic devices, and a storage subsystem comprising memory storing instructions executable by the processing subsystem to receive via the communication subsystem sensor data from a depth image sensor having a fixed perspective of a physical space, obtain object location data comprising a location of an object within the physical space as determined via the sensor data, receive updated object location data, the updated object location data obtained by a different sensor than the depth image sensor, update a current location of the object based on the updated location data obtained by the different sensor, and modify one or more of a phase delay and an amplitude of each of a plurality of audio signals to provide an acoustic sweet spot based on the current location of the object as updated. In such an example, the computing system may additionally or alternatively comprise one or more of a game console, a desktop computer, a laptop computer, a mobile computing device, and a television. In such an example, the instructions may additionally or alternatively be executable to receive the updated object location data from a remote service. In such an example, the sensor data may additionally or alternatively comprise depth image data, and the instructions may additionally or alternatively be executable to obtain the object location data by determining the location of the object within the physical space from the depth image data. In such an example, the sensor data may additionally or alternatively comprise a coordinate location of the object within the physical space.

The configurations and/or approaches described herein are presented for example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a logic subsystem comprising one or more processing devices; and
memory storing instructions executable by the logic subsystem to
receive first map data from a first image sensor having a fixed location within a space;
receive second map data from a second image sensor located within the space;

generate a shared map from the first map data and the second map data;

receive first location data regarding a first location of an object in the shared map of the space as determined from data acquired by the first image sensor;

based on receiving the first location data, send a notification to an audio-providing device regarding the first location of the object as determined from the data acquired by the first image sensor;

receive second location data regarding a second location of the object in the shared map of the space as determined by the second image sensor, the second location being outside of a view of the first image sensor; and based on receiving the second location data, send a notification to the audio-providing device regarding the second location of the object as determined by the second image sensor.

2. The computing system of claim 1, wherein the second image sensor comprises a fixed location within the space.

3. The computing system of claim 1, wherein the second image sensor comprises a location sensor of a mobile device associated with the object.

4. The computing system of claim 1, wherein the instructions are further executable to receive location data regarding a location of each of one or more additional objects within the space as determined from the data acquired by the first image sensor.

5. The computing system of claim 1, wherein the instructions are further executable to receive updated location data regarding a changed location of the object as determined by data acquired from one or more of the first image sensor and the second image sensor; and send a notification to the audio-providing device regarding the changed location of the object.

6. The computing system of claim 1, wherein the instructions are further executable to send instructions to the audio-providing device to adjust an audio signal to be output by the audio-providing device based on the second location of the object.

7. The computing system of claim 6, wherein the instructions to adjust the audio signal comprise instructions regarding one or more of a determined phase delay and a determined amplitude for the audio signal.

8. The computing system of claim 1, wherein the instructions are executable to receive the first location data by receiving coordinate data defining a coordinate of the first location of the object within the space.

9. The computing device of claim 1, wherein the instructions are executable to receive the first location data by receiving depth image data, and wherein the instructions are further executable to determine the first location of the object in the space from the depth image data.

10. A method implemented by a computing system, the method comprising:

receiving first map data from a first image sensor having a fixed location within a space;

receiving second map data from a second image sensor located within the space;

generating a shared map from the first map data and the second map data;

receiving first location data regarding a first location of an object in the shared map of the space as determined from data acquired by the first image sensor;

based on receiving the first location data, sending a notification to an audio-providing device regarding the first location of the object as determined from the data acquired by the first image sensor;

receiving second location data regarding a second location of the object in the shared map of the space as determined from data acquired by the second image sensor having a second fixed perspective of the space, the second location of the object being outside of a view of the first image sensor; and based on receiving the second location data, sending a notification to the audio-providing device regarding the second location of the object as determined from the data acquired by the second image sensor.

11. The method of claim 10, further comprising receiving from the audio-providing device a request to receive notifications regarding a current location of the object.

12. The method of claim 10, wherein receiving the first location data further comprises receiving data regarding a location of each of one or more additional objects in the space as determined from data acquired by the first image sensor.

13. The method of claim 12, further comprising assigning an object identification for each of the object and the one or more additional objects in the space.

14. The method of claim 10, wherein sending the notification to the audio-providing device comprises sending instructions to the audio-providing device to adjust an audio signal to be output by the audio-providing device based on the second location of the object.

15. The method of claim 14, wherein the instructions to adjust the audio signal comprise instructions regarding one or more of a determined phase delay and a determined amplitude for the audio signal.

16. A computing device comprising:
a communication subsystem;
a logic subsystem comprising one or more logic devices; and
a storage subsystem comprising memory storing instructions executable by the logic subsystem to receive a shared map of a physical space generated from sensor data from a depth image sensor and sensor data from a different sensor than the depth image sensor;

receive via the communication subsystem sensor data from the depth image sensor having a fixed perspective of the physical space;

obtain object location data comprising a location of an object within the shared map of the physical space as determined via the sensor data from the depth image sensor;

receive updated object location data, the updated object location data obtained by the different sensor than the depth image sensor;

update a current location of the object within the shared map of the physical space based on the updated location data obtained by the different sensor; and modify one or more of a phase delay and an amplitude of each of a plurality of audio signals to provide an acoustic sweet spot based on the current location of the object as updated within the shared map of the physical space.

17. The computing device of claim 16, wherein the computing device comprises one or more of a game console, a desktop computer, a laptop computer, a mobile computing device, and a television.

18. The computing device of claim 16, wherein the instructions are executable to receive the updated object location data from a remote service.

19. The computing device of claim 16, wherein the sensor data comprises depth image data, and wherein the instructions are executable to obtain the object location data by determining the location of the object within the physical space from the depth image data.

20. The computing device of claim 16, wherein the sensor data comprises a coordinate location of the object within the physical space.

\* \* \* \* \*